United States Patent Office 3,793,368
Patented Feb. 19, 1974

3,793,368
16,17-SECO-B-NOR STEROIDS
Pierre Crabbe, Mexico City, Mexico, and John H. Fried, Palo Alto, Calif., assignors to Syntex Corporation, Panama, Panama
No Drawing. Filed July 1, 1971, Ser. No. 159,009
Int. Cl. C07c 69/12
U.S. Cl. 260—488 B                 11 Claims

ABSTRACT OF THE DISCLOSURE

Novel 16,17-seco steroidal compounds of the B-norandrostane and B-norestrane series, useful as antiandrogenic agents and methods for their preparation.

---

The present invention relates to novel polyhydrophenanthrene derivatives and processes and intermediates useful for the synthesis thereof.

More particularly, this invention relates to certain novel 16,17-seco-B-nor steroids of the androstane and estrane droxylated hydrocarbon radical represented by the formulas:

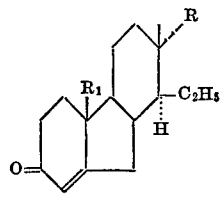

wherein R represents a lower alkyl group, carboxy (COOH) and the alkyl esters thereof, acetyl or a hydroxylated hydrocarbon radical represented by the formulas:

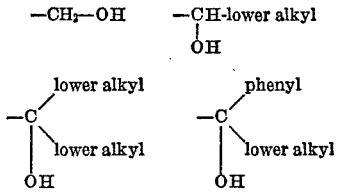

and the conventional hydrolyzable esters and ethers thereof; and $R^1$ represents hydrogen or methyl.

The compounds trisubstituted at C–17 have asymmetric carbon atoms and the various stereoisomers are included within the scope of this invention.

The term "lower alkyl" as used herein refers to straight or branched alkyl groups containing up to 4 carbon atoms, e.g. methyl, ethyl, n-propyl, isopropyl, n-butyl, and the like.

The term "conventional hydrolyzable esters and ethers" as used herein refers to those hydrolyzable carboxylic ester and ether groups known conventionally in the art. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical ester groups include acetate, propionate, butyrate, trimethylacetate, valerate, methylethylacetate, caprocate, t-butylacetate, 3-methylpentanoate, enanthate, caprylate, trimethylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]-octane-1'-carboxylate, adamantoate, and the like. Typical ether groups are methyl ethers, ethyl ether, cyclopentyl ether, cyclohexyl ether, propyl ether, tetrahydropyran-2'-yl ether, tetrahydrofuran-2'-yl ether, 4'-methoxytetrahydropyran-4'-yl ether, and the like.

The compounds of the present invention are valuable pharmaceutical agents possessing anti-androgenic activity. They are of particular utility for the treatment of hyperandrogenic conditions such as acne, prostatic hypertrophy, hirsutism in the female, seborrheic dermatitis and the like.

The compounds of the present invention are obtained by a process illustrated by the following sequence of reactions:

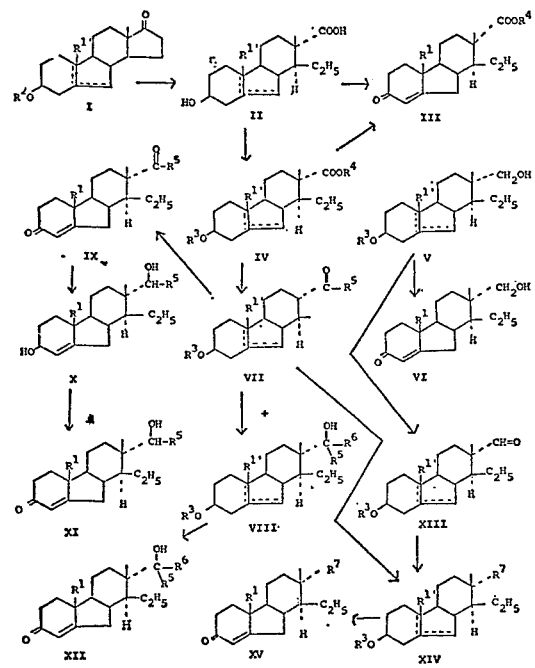

In the above reaction scheme, the dotted lines between C–5(6) and C–5(10) indicate the position of the double bond, the B-norandrostane compounds are unsaturated at C–5(6) and the B-norestrane derivatives are unsaturated at C–5(10), $R^1$ has the above indicated meaning;
$R^{1'}$ is only present in the B-norandrostane derivatives wherein it represents methyl;
$R^2$ represents hydrogen or acetyl;
$R^3$ represents hydrogen or tetrahydropyranyl;
$R^4$ represents hydrogen or lower alkyl, particularly methyl or ethyl;
$R^5$ and $R^7$ represents a lower alkyl group and
$R^6$ represents a lower alkyl group or phenyl.

In practicing the process outlined above, a 3β-hydroxy or acetoxy-B-nor steroid compound of Formula I is submitted to alkali fusion by heating with an excess of a strong alkali metal hydroxide such as sodium hydroxide or potassium hydroxide, at a temperature comprised between 250° and 300° C., for a period of time of the order of 1 to 3 hours, to yield the corresponding 3β-hydroxy-B-nor-16,17-secoandrost-5-en-17-oic acid or the B-nor-16,17-secoestr-5(10)-ene compound (II).

Upon oxidation of these compounds with an aluminum alkoxide such as aluminum t-butoxide or aluminum isopropoxide in the presence of a proton acceptor, i.e. under Oppenauer conditions followed by acid treatment, the corresponding Δ⁴-3-keto compound is obtained (III, $R^4$=hydrogen). The acid is then esterified under conventional conditions, for example by reaction with an ethereal solution of a diazoalkane such as diazomethane or diazoethane. Alternatively, the carboxy group can be esterified first to give compound IV ($R^3$=hydrogen; $R^4$=lower alkyl) and the alkyl ester oxidized as previously mentioned to yield compound III, ($R^4$=lower alkyl).

The 3-hydroxy-16,17-seco-17-oic acid alkyl esters (IV, $R^3$=H, $R^4$=lower alkyl) are converted into the tetrahydropyranyloxy derivatives (IV, $R^3$=tetrahydropyranyl, $R^4$=lower alkyl) by following conventional methods, e.g., by reaction with dihydropyran in benzene solution and in the presence of an acid catalyst.

Reduction of compound IV ($R^3$=tetrahydropyranyl; $R^4$=methyl or ethyl) with a double metal hydride, using particularly lithium aluminum hydride, affords the corresponding 3-tetrahydropyran - 2' - yloxy-17-hydroxy compound (V) which is treated with hydrochloric acid in methanol or acetone solution to hydrolyze the tetrahydropyranylether, and the free compound is selectively oxidized at C-3 under mild Oppenauer conditions, at reflux temperature for a short period of time, of the order of 5 to 15 minutes, preferably for 10 minutes, to yield the corresponding $\Delta^4$-3-keto-17-hydroxy compound (VI), i.e. 16,17-seco-B-norandrost-4-en-17-ol-3-one and 16,17-seco-B-norestr-4-en-17-ol-3-one.

By reaction of a 3-tetrahydropyran-2'-yloxy-16,17-seco-B-norandrost-5-en-17-oic acid alkyl ester or the corresponding 16,17-seco-B-norestr-5(10)-ene compound (IV, $R^3$=tetrahydropyranyl, $R^4$=methyl or ethyl) with from about equivalent amounts up to an excess of a lower alkylmagnesium halide such as methylmagnesium bromide, ethylmagnesium bromide, isopropyl magnesium bromide and the like in an inert organic solvent at reflux temperature for a prolonged period of time of the order of 15 to 24 hours, the corresponding 3-tetrahydropyran-2' - yloxy - 17 - keto-17-alkyl-16,17-seco-B-nor-$\Delta^{5(6)}$ or $\Delta^{5(10)}$-steroidal compound (VII) is produced, in mixture with the 3-tetrahydropyran-2'-yloxy-17-hydroxy - 17 - dialkyl compound (VIII, $R^6$=lower alkyl).

When a 3-tetrahydropyran-2'-yloxy-17-keto - 17 - alkyl-16,17-seco-B-nor-compound (VII) is treated with phenyl lithium in tetrahydrofuran solution or with phenylmagnesium bromide in ether solution, at reflux temperature, there is obtained the 3-tetrahydropyran-2'-yloxy - 17 - hydroxy-17-alkyl-17-phenyl - 16,17 - seco-B-norandrost-5-ene or the corresponding estr-5(10)-ene compound (VIII, $R^3$=tetrahydropyranyl, $R^6$=phenyl).

Acid hydrolysis of compounds of Formulas VII and VIII ($R^3$=tetrahydropyranyl) with p-toluenesulfonic acid or hydrochloric acid in acetone or methanol solution as described hereinabove, produces the corresponding 3-hydroxy-$\Delta^{5(6)}$ or $\Delta^{5(10)}$ compounds (VII and VIII, $R^3$=H), which are oxidized under Oppenauer conditions to afford the corresponding $\Delta^4$-3-keto derivatives IX and XII respectively, e.g. 17-methyl-16,17-seco - B - norandrost-4-ene-3,17-dione (IX; $R^1$ and $R^5$=methyl), 17,17-dimethyl-16,17-seco - B - norandrost-4-en-17-ol-3-one (XII, $R^1$, $R^5$ and $R^6$=methyl), 17-methyl - 17 - phenyl-16,17-seco-B-norandrost-4-en-17-ol-3-one (XII, $R^1$ and $R^5$=methyl; $R^6$=phenyl) and the corresponding estrene compounds.

The 17-hydroxy compounds of Formula XI can be obtained from the 3,17-diketo compounds of Formula IX by reduction with a double metal hydride such as lithium aluminum hydride or sodium borohydride to yield the 3,17-dihydroxy compound (X) which is selectively oxidized at the C-3 position with manganese dioxide or 2,3-dichloro-5,6-dicyano-1,4-benzoquinone in chloroform or dioxane.

Oxidation of a compound of Formula V with chromium trioxide-pyridine complex gives rise to the corresponding 3-tetrahydropyran - 2' - yloxy-16,17-seco-B-nor-17-aldehyde steroid (XIII, $R^3$=tetrahydropyranyl) which is then submitted to reduction of the aldehyde group to the corresponding 17-unsubstituted compound (XIV, $R^3$=tetrahydropyranyl, $R^7$=methyl). The aldehyde group is then eliminated by treatment with ethanedithiol or benzyl mercaptan to yield the 17-thioacetal followed by desulfurization with Raney nickel. Other reaction conditions include the Wolff-Kishner reduction or Clemmenson reduction. Acid treatment regenerates the 3-keto-$\Delta^4$ system (XV).

Similarly reduction of 3-tetrahydropyran-2'-yloxy-17-keto-17-alkyl-16,17-seco-B-nor compounds of Formula VII, e.g. 3-tetrahydropyran-2'yloxy - 17 - keto-17-methyl-16,17-seco-B-norestr-5(10)-ene produces the corresponding compounds substituted at C-17 by an alkyl group, compounds of Formula XIV ($R^7$=alkyl of 2 to 4 carbon atoms) e.g. 3-tetrahydropyran-2'-yloxy-17-methyl-16,17-seco-B-norestr-5(10)-ene, which in turn are hydrolyzed with p-toluenesulfonic or hydrochloric acid and then oxidized under Oppenauer conditions, to afford the corresponding 17 - alkyl-16,17-seco - B - nor-$\Delta^4$-3-keto steroid, XV ($R^7$=alkyl of 2 to 4 carbon atoms), e.g. 17-methyl-16,17-seco-B-norestr-4-en-3-one. Carbonyl reduction of a compound of Formula VII can be accomplished by, for example, a Wolff-Kishner reduction, i.e., by refluxing with hydrazine hydrate under strong alkaline conditions, a Clemmensen reduction, or thioketal formation followed by treatment with Raney nickel, as described above.

The compounds possessing hydroxy groups (Formulas VI, XI and XII) can be esterified or etherified following the conventional esterification and etherification methods known to the skilled in the art, i.e., esterification with an acid anhydride or acid chloride in pyridine solution for the esterification of primary and secondary hydroxyl groups (VI and XI) and with carboxylic acid anhydrides in benzene solution and in the presence of an acid catalyst such as p-toluenesulfonic acid or with a mixture of a carboxylic acid-carboxylic anhydride in the presence of an acid catalyst followed by mild alkaline or acid treatment for the $\Delta^4$-3-keto compounds having tertiary hydroxy groups (XII).

Etherification is also carried out by conventional techniques. Thus, reaction with dihydropyran, dihydrofuran, or 4-methoxy-5,6-dihydro-2H-pyran in an inert solvent such as benzene and in the presence of an acid catalyst produces the tetrahydropyran-2'-yloxy, tetrahydrofuran-2'-yloxy, tetrahydrofuran-2'-yloxy or 4'-methoxytetrahydropyran-4'-yloxy derivatives, respectively. Methyl, ethyl, and cyclopentyl ethers, for example, are prepared upon reaction of the hydroxy compound with sodium hydride and methyl iodide, ethyl iodide and cyclopentyl bromide, respectively.

The starting materials for the process outlined above are known compounds or can be obtained by known methods. $3\beta$-acetoxy-B-norandrost-5-en-17-one and its $3\beta$-hydroxy derivative have been described for example, By J. Joska et al. in Coll. Czech. Chem. Commun., vol. 23, 1377 (1958) and U.S. Pat. 3,072,681 (Re. 26,050). $3\beta$-hydroxy - B - norestr-5-en-17-one and its acetate can be obtained from $3\beta$,19-dihydroxy-B-norandrost-5-en-17-one (U.S. Pat. 3,284,505), by a process which involves ketalization at C-17, oxidation with chromium trioxide-pyridine to 3-keto-17-ethylenedioxy-B-norandrost - 5 - en-19-oic acid, decarboxylation by heating with pyridine to yield 3-keto-17-ethylenedioxy-B-norestr-5(10)-ene, LiAlH$_4$ reduction at C-3 hydrolysis of the protecting group at C-17 and esterification of the hydroxyl group at C-3 if desired.

Alternatively, the $3\beta$,19-diacetoxy-B-norandrost-5-en-17-one can be ketalized at C-17 and the resultant ketal base hydrolyzed to the $3\beta$,19-dihydroxy compound which can be oxidized under Oppenauer conditions to give 17,17-ethylenedioxy-B-norandrost-4-en-17-ol-3-one. This compound when oxidized with chromic acid in pyridine gives the corresponding 19-oic acid which can be decarboxylated to give 17,17-ethylenedioxy-B-norestr-5(10)-en-3-one.

The following examples illustrate but are not intended to limit the scope of the present invention.

PREPARATION 1

A mixture of 5 g. of 3β,19-dihydroxy-B-norandrost-5-en-17-one, 750 ml. of anhydrous benzene, 180 ml. of ethyleneglycol distilled over sodium hydroxide and 2.4 g. of p-toluene sulfonic acid monohydrate is refluxed for 8 hours using a Dean Stark trap for the continuous removal of the water formed during the reaction. At the end of this time, the reaction mixture is cooled, sodium bicarbonate solution added to the cooled mixture and the organic phase is separated, washed with water, dried over sodium sulfate and evaporated to dryness to yield 3β,19-dihydroxy-17-ethylenedioxy-B-norandrost-5-ene.

A solution of 10 g. of the foregoing crude ketal in 200 ml. of pyridine is added to a mixture of 10 g. of chromium trioxide in 200 ml. of pyridine. The reaction mixture is allowed to stand at room tempearture for 3 days, and then diluted with ethyl acetate and filtered through Celite, diatomaceous earth, washing the solid with hot ethyl acetate. The combined filtrates are washed well with water, dried over sodium sulfate and evaporated to dryness, thus producing 3-keto-17-ethylenedioxy-B-norandrost-5-en-19-oic acid.

The crude acid is dissolved in 40 ml. of pyridine and heated at reflux temperature for 1 hour. The pyridine is then evaporated to dryness under reduced pressure, to give 17-ethylenedioxy-B-norestr-5(10)-en-3-one, which is purified by TLC.

A mixture of 1 g. of B-norandrost-5-ene-3β,19-diol-17-one, 4 ml. of pyridine and 2 ml. of acetic anhydride is allowed to stand at room temperature for 15 hours. The mixture is then poured into ice water and the solid which forms is collected by filtration, washed with water and dried to yield 3β,19-diacetoxy-B-norandrost-5-en-17-one which may be further purified through recrystallization from acetone:hexane.

A mixture of 1 g. of 3β,19-diacetoxy-B-norandrost-5-en-17-one, 25 ml. of dry benzene, 5 ml. of ethylene glycol and 50 mg. of p-toluenesulfonic acid monohydrate is refluxed for 16 hours using a water separator. The reaction mixture is then washed with aqueous sodium bicarbonate solution and water, dried and evaporated to dryness to yield 3β,19-diacetoxy-17,17-ethylenedioxy-B-nor-androst-5-ene which is recrystallized from acetone:hexane.

A solution of 1 g. of 3β,19-diacetoxy-17,17-ethylenedioxy-B-nor-androst-5-ene in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 17,17-ethylenedioxy-B-norandrost-5-ene-3β,19-diol which is recrystallized from methylene chloride:ether.

A solution of 1 g. of 17,17-ethylenedioxy-B-norandrost-5-ene-3β,19-diol in 80 ml. of toluene and 20 ml. of cyclohexanone is dried by removing 10 ml. of solvent by distillation. A solution of 1 g. of aluminum isopropoxide in 7 ml. of anhydrous toluene is then added and the mixture refluxed for 45 minutes. Four milliliters of acetic acid are added and the solvents removed by steam distillation. The residue is extracted several times with ethyl acetate and these extracts are then washed with 5% hydrochloric acid solution, water, 10% sodium carbonate solution and water to neutrality, dried over anhydrous sodium sulfate and evaporated to dryness to yield 17,17-ethylenedioxy-B-norandrost-4-en-19-ol-3-one which may be further purified by recrystallization from acetone:hexane.

A solution of 6 g. of 17,17-ethylenedioxy-B-norandrost-4-en-19-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17,17-ethylenedioxy-B-norandrost-4-en-3-one-19-oic acid which may be further purified by recrystallization from acetone:hexane.

A solution of 0.35 parts by weight of 17,17-ethylenedioxy-B-norandrost-4-en-3-one-19-oic acid in two parts by volume of pyridine is gradually heated to 120° C. The mixture is heated thereat for about 5 minutes, after which time the pyridine is evaporated under reduced pressure. The residue is dispersed in water and extracted with ether. The ether extracts are washed, dried, and evaporated to give 17,17-ethylenedioxy-B-norestr-5(10)-en-3-one which can be recrystallized from ether.

A solution of 5 g. of 17-ethylenedioxy-B-norestr-5(10)-en-3-one in 100 ml. of anhydrous tetrahydrofuran is added dropwise, under stirring, to 2.5 g. of lithium aluminum hydride in 150 ml. of anhydrous tetrahydrofuran and the reaction mixture is refluxed for 2 hours. The reaction mixture is then cooled and the excess reagent destroyed by careful addition of saturated solution of sodium sulfate and solid sodium sulfate. The resulting mixture is filtered through Celite diatomaceous earth and the filtrate extracted several times with methylene chloride; the combined organic extracts are washed to neutral, dried over sodium sulfate and evaporated to dryness. The residue is dissolved in 100 ml. of acetone, 1 g. of p-toluenesulfonic acid is added and the mixture is allowed to stand at room temperature for 6 hours. It is then diluted with water, extracted with methylene chloride and the combined organic extracts washed with water, 5% sodium bicarbonate solution and water to neutral, dried over sodium sulfate and evaporated to dryness under vacuo. Chromatography of the residue on Florisil, using hexane: ethyl acetate (60:40) as eluant affords the pure B-norestr-5(10)-en-3β-ol-17-one.

A mixture of 3.5 g. of B-norestr-5(10)-en-3β-ol-17-one, 20 ml. of pyridine and 20 ml. of acetic anhydride is kept at room temperature for 18 hours. The reaction mixture is then poured into ice-water, extracted with methylene chloride and the organic extract washed with water to neutral, dried over sodium sulfate and evaporated to dryness under vacuo. The residue is crystallized from acetone-ether, to yield 3β-acetoxy-B-norestr-5(10)-en-17-one.

EXAMPLE 1

A mixture of 300 g. of potassium hydroxide and 45 ml. of water is heated to 260° C. in a nickel crucible, 10 g. of 3β-acetoxy-B-norandrost-5-en-17-one are added and the temperature is then raised to 290–300° C., maintaining this temperature during 45 minutes. At the end of this time the foaming mass formed is allowed to cool to room temperature, water is added and the reaction mixture is allowed to stand at said temperature overnight so the excess of potassium hydroxide dissolves. The aqueous solution is filtered through Celite, (diatomaceous earth) and the filtrate is made acidic by the addition of an excess of concentrated hydrochloric acid. The precipitate which forms is collected by filtration, washed with water and air dried, to produce 3β-hydroxy-16,17-seco-B-norandrost-5-en-17-oic acid.

A solution of 9.5 g. of 3β-hydroxy-16,17-seco-B-norandrost-5-en-17-oic acid in 200 ml. of methylene chloride is treated with 50 ml. of an etheral solution of diazomethane and the mixture is kept at room temperature for one hour. The excess diazomethane is then destroyed by adding a few drops of acetic acid, the solvents are eliminated under vacuo and the residue is purified by TLC to yield 3β-hydroxy-16,17-seco-B-norandrost-5-en-17-oic acid methyl ester.

By the same method 3β-acetoxy-B-norester-5(10)-en-17-one is converted into 3β-hydroxy-16,17-seco-B-norestr-5(10)-en-17-oic acid and its methyl ester.

The ethyl esters are obtained when using diazoethane in lieu of diazomethane.

EXAMPLE 2

A solution of 5 g. of 3β-hydroxy-16,17-seco-B-norandrost-5-en-17-oic acid methyl ester in 300 ml. of toluene and 100 ml. of cyclohexanone is dried by distilling off 50 ml. of the solvent. A solution of 5 g. of aluminum isopropoxide dissolved in 35 ml. of anhydrous toluene is then added and the reaction mixture is refluxed for 45 minutes; 10 ml. of acetic acid are added and the solvents removed by steam distillation. The product is extracted several times with ethyl acetate and the organic extracts washed with 5% hydrochloric acid solution, water, 10% sodium carbonate solution and water until neutral, dried over sodium sulfate and evaporated to dryness under reduced pressure, to yield 3-keto-16,17-seco-B-norandrost-4-en-17-oic acid methyl ester, which can be purified by crystallization from acetone-hexane.

In a similar manner, 3β-hydroxy-16,17-seco-B-norestr-5(10)-en-17-oic acid methyl ester is converted into 3-keto-16,17-seco-B-norestr-4-en-17-oic acid methyl ester.

EXAMPLE 3

A solution of 1 g. of 3β-hydroxy-16,17-seco-B-norestr-5(10)-en-17-oic acid in 80 ml. of toluene and 20 ml. of cyclohexanone is dried by distilling off 10 ml. of the solvent. A solution of 1 g. of aluminum isopropoxide dissolved in 7 ml. of anhydrous toluene is then added and the mixture is refluxed for 30 minutes; 4 ml. of acetic acid are added and the solvents removed by steam distillation. The resultant mixture is acidified to pH 4 with concentrated hydrochloric acid, and the product extracted several times with methylene chloride. The organic extracts are washed well with water, dried over sodium sulfate and evaporated to dryness under reduced pressure, to yield 3-keto-16,17-seco-B-norestr-4-en-17-oic acid, which can be purified by crystallization from ether.

EXAMPLE 4

To a solution of 5 g. of 3β-hydroxy-16,17-seco-B-norestr-5(10)-en-17-oic acid methyl ester in 75 ml. of benzene are added 10 ml. of dihydropyran, and about 5 ml. are distilled to remove moisture. The reaction mixture is then cooled, 0.2 g. of p-toluenesulfonic acid are added and the mixture is allowed to stand at room temperature for 4 days. The solution is washed with sodium carbonate solution and water, dried and evaporated. The residue is chromatographed on 150 g. of neutral alumina. The fractions eluted with hexane and benzene yield 3β-tetrahydropyran-2'-yloxy-16,17-seco-B-norestr-5(10 - en - 17-oic acid methyl ester.

A solution of 1.8 g. of 3β-tetrahydropyran-2'-yloxy-16,17-seco-B-norestr-5(10)-en-17-oic acid methyl ester in 60 ml. of anhydrous tetrahydrofuran is added dropwise, under stirring, to 1.8 g. of litium aluminum hydride in 30 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resulting mixture is filtered through Celite diatomaceous earth and the filtrate extracted several times with methylene chloride: the combined organic extracts are washed to neutral, dried over sodium sulfate and evaporated to dryness. Chromatography of the residue on silica gel, using hexane:ethyl acetate (60:40) as eluant affords 3β-tetrahydropyran-2'-yloxy-16,17-seco-B-norestr-5(10)-en-17-ol.

A mixture of 1.5 g. of 3β-tetrahydropyran-2'-yloxy-16,17-seco-B-norestr-5(10)-en-17-ol, 20 ml. of methanol and 0.5 ml. of concentrated hydrochloric acid is kept at room temperature for 1 hour. It is then diluted with water and extracted with methylene chloride. The organic extract is washed with water, sodium bicarbonate solution and water to neutral, dried over sodium sulfate and evaporated to dryness under reduced pressure, to yield 16,17-seco-B-norestr-5(10)-ene-3β,17-diol, which is used for the next step without further purification.

A solution of 1 g. of the crude 16,17-seco-B-norestr-5(10-ene-3β,17β-diol in 50 ml. of toluene and 5 ml. of cyclohexanone is dried by distillation of 5 ml. of the solvent mixture. A solution of 250 mg. of aluminum isopropoxide dissolved in 2 ml. of anhydrous toluene and 0.5 ml. of cyclohexanone is then added, and the reaction mixture is refluxed for 10 minutes; 1 ml. of acetic acid is added and the solvents eliminated by steam distillation. The product is extracted with ethyl acetate and the combined organic extracts are washed with 5% hydrochloric acid solution, water, 5% sodium carbonate solution and water to neutral, dried over sodium sulfate and evaporated to dryness. The residue is purified by chromatography on Florisil, to yield 16,17-seco-B-norestr-4-en-17-ol-3- one.

In a similar manner, starting from 3β-hydroxy-16,17-seco-B-norandrost-5-en-17-oic acid methyl ester there is obtained as final product 16,17-seco-B-norandrost-4-en-17-ol-3-one.

EXAMPLE 5

A solution of 16 g. of 3β-tetrahydropyran-2'-yloxy-16,17-seco-B-norestr-5(10)-en-17-oic acid methyl ester in 250 ml. of anhydrous tetrahydrofuran is treated with an excess (approximately 200 ml.) of 4 N methylmagnesium bromide in ether and the mixture is refluxed with the exclusion of moisture for 18 hours. The cooled mixture is cautiously treated with excess aqueous ammonium chloride solution and the product isolated by extraction with methylene chloride. The extract is washed with water, dried over sodium sulfate and evaporated to dryness. The residue is purified by TLC using a mixture of hexane-ethyl acetate 95:5 as gradient to produce 3β-tetrahydropyran - 2' - yloxy-17-methyl-16,17-seco-B-norestr-5(10)-en-17-one and 3β - tetrahydropyran - 2'-yloxy-17,17-dimethyl-16,17-seco-B-norestr-5(10)-en-17-ol.

The foregoing compounds are hydrolyzed with dilute hydrochloric acid in methanol, and the 3-hydroxy compounds oxidized with aluminum isopropoxide, in accordance with the method of Examples 4 and 2, respectively, to yield 17-methyl-16,17-seco-B-norestr-4-ene-3,17-dione and 17,17-dimethyl-16,17-seco-B-norestr-4-en-17-ol-3-one, respectively.

In a similar manner, starting from 3β-tetrahydropyran-2' - yloxy - 16,17 - seco - B - norandrost-5-en-17-oic acid methyl ester there are obtained as final products 17-methyl - 16,17 - seco - B - norandrost-4-ene-3,17-dione and 17,17-dimethyl-16,17-sec-B-norandrost-4-ene-17-ol-3-one.

EXAMPLE 6

A solution of 1 g. of 3β-tetrahydropyran-2'-yloxy-16,17-seco-B-norestr-5(10)-en-17-ol in 20 ml. of pyridine is added to a mixture of 1 g. of chrominum trioxide and 20 ml. of pyridine. The reaction mixture is allowed to stand at room temperature for 12 hours, and then diluted with ethyl acetate and filtered through Celite, diatomaceous earth, washing the solid with hot ethyl acetate. The combined filtrates are washed well with water, dried over sodium sulfate and evaporated to dryness, thus producing 3β - tetrahydropyran - 2' - yloxy - 16,17-seco-B-norestr-5(10)-en-17-al which is purified by crystallization from acetone-ether.

A mixture of 1 g. of 3β-tetrahydropyran-2'-yloxy-16,17-seco-B-norestr-5(10)-en-17-al, 2 g. of hydrazine hydrate, 1.2 g. of potassium hydroxide, 1.2 ml. of water and 1.2 ml. of diethyleneglycol is heated under reflux for 45 minutes. It is then heated in an open flask until the temperature of the reaction mixture reaches 200° C., a reflux condenser is attached, and refluxing is continued for 2 hours further. The solution is then cooled, water is added and the product isolated by extraction with ether. The combined organic extracts are washed with water to neutral, dried over sodium sulfate and evaporated to dryness under vacuo. The residue is dissolved in 20 ml. of acetone, 0.5 g. of p-toluenesulfonic acid is added, and the mixture is kept at room temperature for 6 hours. The reaction mixture is then diluted with water and extracted with methylene chloride and the organic extracts washed with water to neutral, dried over sodium sulfate and evaporated to dryness under reduced pressure. The residue is purified by TLC to give the pure 3β-tetrahydropyran-2'-yloxy-16,17-seco-B-norestr-5(10)-ene.

Alternatively, the following procedure can be employed.

To a solution of 1 g. of 3β-tetrahydropyran-2'-yloxy-16,17-seco-B-norestr-5(10)-ene-17-al in 5 ml. of ethyl ether are added 0.5 ml. of benzyl mercaptan and three drops of boron trifluoride etherate, and the mixture is kept at room temperature for 20 hours. It is then diluted with ether and the ethereal solution washed several times with 5% potassium hydroxide solution and water to neutral, dried and evaporated to dryness. The residue is dissolved in 150 ml. of ethanol, 5 g. of Raney nickel are added and the reaction mixture refluxed under stirring for 24 hours. The suspension is then filtered through Celite diatomaceous earth, and the nickel is washed well with hot ethanol. The combined filtrate and washings are evaporated to dryness, and the residue purified by chromatography on Florisil, thus yielding 3β-tetrahydropyran-2'-yloxy-16,17-seco-B-norestr-5(10)-ene.

Upon hydrolysis of the protecting group at C–3 with hydrochloric acid in methanol solution followed by Oppenauer oxidation, in accordance with the methods of Examples 4 and 2, respectively, 16,17-seco-B-norestr-4-en-3-one is produced.

Likewise 3β - tetrahydropyran - 2'-yloxy-16,17-seco-B-norandrost-5-en-17-ol is converted into 16,17-seco-B-nor-androst-4-en-3-one.

EXAMPLE 7

The method of Example 5 is repeated with the exception of using ethereal ethylmagnesium bromide and n-propylmagnesium bromide as reagents instead of methylmagnesium bromide, to produce 3β-tetrahydropyran-2'-yloxy - 17 - ethyl - 16,17-seco-B-norestr-5(10)-ene-17-one and 3β-tetrahydropyran-2'-yloxy-17,17-diethyl-16,17-seco-B-norestr-5(10)-ene-17-ol, and 3β - tetrahydropyran-2' - yloxy - 17 - propyl-16,17-sec-B-norestr-5(10)-en-17 - one and 3β-tetrahydropyran-2'-yloxy-17,17-dipropyl-16,17 - seco - B - norestr - 5(10) - en-17-ol, respectively, which are in turn hydrolyzed with hydrochloric acid in acetone and oxidized under Oppenauer conditions by following the methods of the preceding examples, to yield 17 - ethyl - 16,17 - seco-B-norestr-4-ene-3,17-dione, 17,17-diethyl-16,17-sec-B-norestr-4 - en - 17 - ol - 3 - one, 17-propyl - 16,17 - seco - B - norestr-4-ene-3,17-dione and 17,17 - dipropyl - 16,17 - seco - B-norestr-4-en-17-ol-3-one, respectively.

EXAMPLE 8

A solution of 2 g. of 3β-tetrahydropyran-2'-yloxy-17-methyl - 16,17 - seco - B-norandrost-5-en-17-one in 250 ml. of anhydrous tetrahydrofuran is added dropwise to a solution of 10 molar equivalents of phenyl lithium in 150 ml. of ether with mechanical stirring and under an atmosphere of nitrogen. The mixture is then refluxed for 5 hours, cooled, poured into ice water and acidified with hydrochloric acid, stirring vigorously for 1 hour. The product is then extracted with methylene chloride and the organic extracts washed with water to neutral, dried over sodium sulfate and evaporated to dryness, to yield 17 - methyl - 17 - phenyl - 16,17-seco-B-norandrost-5-ene-3,17-diol.

Oxidation of the foregoing compound with aluminum isopropoxide in toluene-cyclohexanone, in accordance with the method of Example 2, affords 17-methyl-17-phenyl-16,17-seco-B-norandrost-4-en-17-ol-3-one.

EXAMPLE 9

A solution of 2.0 g. of 17-methyl-16,17-seco-B-norestr-4-ene-3, 17-dione in 50 ml. of anhydrous tetrahydrofuran is added dropwise, under stirring, to 2.0 g. of lithium aluminum hydride in 30 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resltant mixtre is filtered through Celite diatomaceous earth and the filtrate extracted several times with methylene chloride; the combined organic extracts are washed to neutral, dried over sodium sulfate and evaporated to dryness. The residue is dissolved in 100 ml. of chloroform distilled from calcium chloride, 10 g. of freshly precipitated manganese dioxide are added and the reaction mixture is stirred for 18 hours at room temperature. The inorganic material is filtered off, washed with hot chloroform and the combined chloroformic solutions evaporated to dryness under vacuo. Recrystallization of the residue from acetone-hexane affords 17-methyl-16,17-seco-B-norestr-4-en-17-ol-3-one.

In a similar manner, 17-methyl-16,17-seco-B-norandrost-4-ene-3,17-dione is converted into 17-methyl-16,17-seco-B-norandrost-4-en-17-ol-3-one.

EXAMPLE 10

A mixture of 1 g. of 3β-tetrahydropyran-2'-yloxy-17-methyl-16,17-seco-B-norestr-5(10)-en-17-one, 2 g. of hydrazine hydrate, 1.2 g. of potassium hydroxide, 1.2 ml. of water and 1.2 ml. of diethyleneglycol is heated under reflux for 45 min. It is then heated in an open flask until the temperature of the reaction mixture reaches 200° C., a reflux condenser is attached, and refluxing is continued for 2 hours further. The solution is then cooled, water is added and the product isolated by extraction with ether. The combined organic extracts are washed with water to neutral, dried over sodium sulfate and evaporated to dryness under vacuo. The residue is dissolved in 20 ml. of acetone, 0.5 g. of p-toluenesulfonic acid is added, and the mixture is kept at room temperature for 6 hours. The reaction mixture is then diluted with water and extracted with methylene chloride and the organic extracts washed with water to neutral, dried over sodium sulfate and evaporated to dryness under reduced pressure. The residue is purified by TLC to give the pure 17-methyl-16,17-seco-B-norestr-5(10)-en-3-ol, which is oxidized under Oppenauer conditions, in accordance with the method of Example 2, to afford 17-methyl-16,17-seco-B-norestr-4-en-3-one.

In a similar manner, 3β-tetrahydropyran-2'-yloxy-17-methyl-16,17-seco-B-norandrost-5-en17-one is converted into 17-methyl-16,17-seco-B-norandrost-4-en-3-one.

EXAMPLE 11

A mixture of 1.5 g. of 16,17-seco-B-norestr-4-en-17-ol-3-one, 10 ml. of pyridine and 5 ml. of acetic anhydride is kept at room temperature for 18 hours. The mixture is then poured into ice water, extracted with methylene chloride and the organic extracts washed with water to neutral, dried over sodium sulfate and evaporated to dryness under vacuo. The residue is purified by TLC, to afford 17-acetoxy-16,17-seco-B-norestr-4-en-3-one in pure form.

In like manner, using propionic, caproic and cyclopentylpropionic anhydrides as esterifying agents in lieu of acetic anhydride the corresponding 17-propionoxy, 17-caproxy and 17-cyclopentylpropionoxy derivatives of 16,17-seco-B-norestr-4-en-3-one are obtained. In like manner, the 17-esters and ethers of 16,17-seco-B-norandrost-4-en-3-one are prepared, e.g., 17-acetoxy-16,17-seco-B-norandrost-4-en-3-one.

EXAMPLE 12

To a cold solution of 1 g. of 16,17-seco-B-norandrost-4-en-17-ol-3-one in 10 ml. of pyridine is added 6 ml. of heptanoyl chloride and the reaction mixture is allowed to stand for 18 hours at room temperature. The reaction mixture is then concentrated to a small volume under vacuo, diluted with water and extracted with methylene chloride; the organic extracts are washed with water to neutrality, dried over sodium sulfate and evaporated to dryness under reduced pressure. Crystallization of the residue from acetone-hexane gives 17-heptanoyloxy-16,17-seco-B-norandrost-4-en-3-one.

By the same method, 16,17-seco-B-norestr-4-en-17-ol-3-one is converted into the corresponding heptanoate.

EXAMPLE 13

Two milliliters of dihydropyran are added to a solution of 1 g. of 16,17-seco-B-norestr-4-en-17-ol-3-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane and benzene to yield 17-tetrahydropyran-2'-yloxy-16,17-seco-B-norestr-4-en-3-one.

By employing the method of the preceding paragraph using dihydrofuran in lieu of dihydropyran, the corresponding 17-tetrahydrofuran-2'-yloxy-16,17-seco-B-norestr-4-en-3-one product is obtained. Similarly, 17-(4'-methoxy-tetra-hydropyran-4'-yloxy)-16,17-seco-B-norestr-4-en-3-one is prepared by utilization of the foregoing procedure employing 4-methoxy-5,6-dihydro-2H-pyran in lieu of dihydropyran.

In a similar manner, the tetrahydropyranyl-, tetrahydrofuranyl- and 4'-methoxy-tetrahydropyranyl ethers of 16,17-seco-B-norandrost-4-en-17-ol-3-one, 17-methyl-16,17-seco-B-norandrost-4-en-17-ol-3-one, 17-methyl-16,17-seco-B-norestr-4-en-17-ol-3-one, 17,17-dimethyl-16,17-seco-B-norestr-4-en-17-ol-3-one and 17-methyl-17-phenyl-16,17-seco-B-norestr-4-en-17-ol-3-one are obtained.

EXAMPLE 14

A solution of 0.5 g. of 16,17-seco-B-norestr-4-en-17-ol-3-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents (based on the amount of starting steroid) of cyclopentyl bromide in 10 ml. of benzene, over a period of 20 minutes. The mixture is allowed to reflux for 20 hours after which time the precipitate of sodium bromide is removed by filtration and the organic phase dried and evaporated to yield 17-cyclopentyloxy-16,17-seco-B-norestr-4-en-3-one which is further purified upon recrystallization from pentane.

Alternatively, methyl iodide and ethyl iodide can be used in lieu of cyclopentyl bromide to produce 17-methoxyl-6,17-seco-B-norestr-4-en-3-one and 17-ethoxy-16,17-seco-B-norestr-4-en-3-one, respectively.

Likewise, the 17-cyclopentyl, methyl, and ethyl ethers of 16,17-seco-B-norandrost-4-en-17-ol-3-one and 17-methyl-16,17-seco-B-norestr-4-en-17-ol-3-one are obtained.

EXAMPLE 15

A mixture of 1 g. of 17,17-dimethyl-17-hydroxy-16,17-seco-B-norestr-4-en-3-one, 2 ml. of acetic anhydride, 5 ml. of acetic acid and 1 g. of p-toluenesulfonic acid is kept at room temperature for 2 hours. The reaction mixture is then diluted with water, extracted with methylene chloride and the organic extracts washed with water and evaporated to dryness under vacuo. The residue is dissolved in 20 ml. of methanol, 0.2 ml. of concentrated hydrochloric acid are added and the reaction mixture is allowed to stand at room temperature for 1 hour. It is then diluted with water, extracted with methylene chloride and the combined organic extracts washed with water, sodium bicarbonate solution and water to neutral, dried over sodium sulfate and evaporated to dryness under vacuo. The residue is purified by TLC to yield 17,17-dimethyl-17-acetoxy-16,17-seco-B-norestr-4-en-3-one.

By using propionic anhyride and enanthic anhydride in place of acetic anhydride the corresponding propionate and enanthate of 17,17-dimethyl-17-hydroxy-16,17-seco-B-norestr-4-en-3-one are obtained.

In a similar manner, 17,17-dimethyl-16,17-seco-B-norandrost-4-en-17-ol-3-one is converted into the corresponding acetate, propionate, and enanthate.

What is claimed is:

1. A compound represented by the following formula:

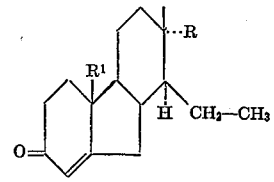

wherein R is a hydroxylated hydrocargon radical represented by the formulas:

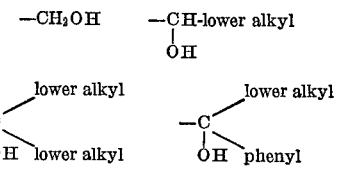

and esters thereof selected from the group consisting of the acetate, propionate, butyrate, trimethylacetate, valerate, methylethylacetate, caproate, t-butylacetate, 3-methylpentanoate, enanthate, caprylate, trimehylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]octane-1'-carboxylate, and adamantoate and ethers thereof selected from the group consisting of methyl ether, ethyl ether, cyclopentyl ether, cyclohexyl ether, propyl ether, tetrahydropyran-2'-yl ether, tetrahydrofuran-2'-yl ether, and 4'-methoxytetrahydropyran-4'-yl ether and R¹ is hydrogen or methyl.

2. A compound according to claim 1 wherein R is hydroxymethyl.

3. A compound according to claim 1 wherein R is the group

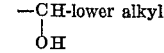

and esters thereof selected from the group consisting of the acetate, propionate, butyrate, trimethylacetate, valerate, methylethylacetate, caproate, t-butylacetate, 3-methylpentanoate, enanthate, caprylate, trimethylacetate, pelargonate, deconoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]octane - 1' - carboxylate, and adamantoate and ethers thereof selected from the group consisting of methyl ether, ethyl ether, cyclopentyl ether, cyclohexyl ether, propyl ether, tetrahydropyran-2'-yl ether, tetrahydrofuran-2'-yl ether, and 4'-methoxytetrahydropyran-4'-yl ether.

4. A compound according to claim 1 wherein R is the group

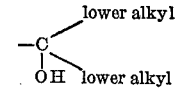

and esters thereof selected from the group consisting of the acetate, propionate, butyrate, trimethylacetate, valerate, methylethylacetate, caproate, t-butylacetate, 3-methylpentanoate, enanthate, caprylate, trimethylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]octane - 1' - carboxylate, and adamantoate and ethers thereof selected from the group consisting of methyl ether, ethyl ether, cyclopentyl ether, cyclohexyl ether, propyl ether, tetrahydropyran-2'-yl ether, tetrahydrofuran-2'-yl ether, and 4'-methoxytetrahydropyran-4'-yl ether.

5. A compound according to claim 1 wherein R is the group

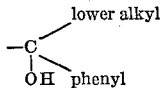

and esters thereof selected from the group consisting of the acetate, propionate, butyrate, trimethylacetate, valerate, methylethylacetate, caproate, t-butylacetate, 3-methylpentanoate, enanthate, caprylate, trimethylacetate, pelargonate, decanoate, undecenoate, benzoate, phenylacetate, diphenylacetate, cyclopentylpropionate, methoxyacetate, aminoacetate, diethylaminoacetate, trichloroacetate, β-chloropropionate, bicyclo-[2.2.2]octane - 1' - carboxylate, and adamantoate and ethers thereof selected from the group consisting of methyl ether, ethyl ether, cyclopentyl ether, cyclohexyl ether, propyl ether, tetrahydropyran-2'-yl ether, tetrahydrofuran-2'-yl ether, and 4'-methoxytetrahydropyran-4'-yl ether.

6. A compound according to claim 2 wherein R is hydroxymethyl and $R^1$ is methyl; 16,17-seco-B-norandrost-4-en-17-ol-3-one.

7. A compound according to claim 2 wherein R is hydroxymethyl and $R^1$ is hydrogen; 16,17-seco-B-norestr-4-en-17-ol-3-one.

8. A compound according to claim 2 wherein R is acetoxymethyl and $R^1$ is methyl; 17-acetoxy-16,17-seco-B-norandrost-4-en-3-one.

9. A compound according to claim 2 wherein R is acetoxymethyl and $R^1$ is hydrogen; 17-acetoxy-16,17-seco-B-norestr-4-en-3-one.

10. A compound according to claim 4 wherein the alkyl groups are methyl and $R^1$ is methyl; 17,17-dimethyl-16,17-seco-B-norandrost-4-en-17-ol-3-one.

11. A compound according to claim 4 wherein the alkyl groups are methyl and $R^1$ is hydrogen; 17,17-dimethyl-16,17-seco-B-norestr-4-en-17-ol-3-one.

References Cited
UNITED STATES PATENTS

| | | | |
|---|---|---|---|
| 2,839,537 | 6/1958 | Miescher et al. | 260—586 H X |
| 3,072,681 | 1/1963 | Kerwin | 260—586 H X |

LEON ZITVER, Primary Examiner

U.S. Cl. X.R.

260—468 R, 468 G (formerly B), 476 C, 482 R, 410, 484 R, 487, 345.9, 347.8, 586 H, 514 R, 999

UNITED STATES PATENT OFFICE
CERTIFICATE OF CORRECTION

Patent No. 3,793,368      Dated February 19, 1974

Inventor(s) PIERRE CRABBE et al      (Page 1)

It is certified that error appears in the above-identified patent and that said Letters Patent are hereby corrected as shown below:

Column 1, line 21, change "droxylated hydrocarbon radical represented by the formulas" to --series, represented by the following formula--.

Column 2, line 4, change "methyl ethers" to --methyl ether--.

Column 2, lines 20-27, change

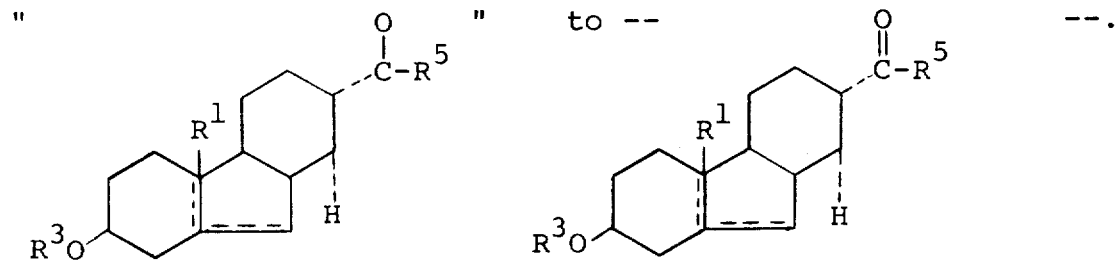

Column 2, line 55, change "represents" to --represent--.

Column 4, line 8, change "Similarly reduction of" to --Similarly carbonyl reduction of--.

Column 4, line 27, change "hydroxy" to --hydroxyl--.

Column 7, line 48, change "(10-en-" to --(10)-en- --.

Column 8, line 2, change "5(10-ene-" to --5(10)-ene- --.

UNITED STATES PATENT OFFICE
CERTIFICATE OF CORRECTION

Patent No. 3,793,368          Dated February 19, 1974

Inventor(s) PIERRE CRABBE et al      (Page 2)

It is certified that error appears in the above-identified patent and that said Letters Patent are hereby corrected as shown below:

Column 8, line 37, change "is" to --in--.

Column 8, line 39, change "method" to --methods--.

Column 8, line 48, change "sec-B-norandrost-4-ene-" to --seco-B-norandrost-4-en- --.

Column 9, line 10, change "(10)-ene-" to --(10)-en- --.

Column 9, line 32, change "nor-androst" to --norandrost--.

Column 9, line 38 and 40, change "-ene-" to -- -en- --.

Column 9, line 48, change "-sec-B-" to -- -seco-B- --.

Column 10, line 47, change "en17" to --en-17--.

Column 11, line 24, change "tetra-hydropyran" to --tetrahydropyran--.

Column 12, line 19, change "hydrocargon" to --hydrocarbon--.

Signed and sealed this 13th day of May 1975.

(SEAL)
Attest:

RUTH C. MASON
Attesting Officer

C. MARSHALL DANN
Commissioner of Patents
and Trademarks